(12) United States Patent
Arbesman et al.

(10) Patent No.: US 9,388,872 B1
(45) Date of Patent: Jul. 12, 2016

(54) FRICTION FUSION FASTENING SYSTEM

(71) Applicant: Ray Arbesman, Toronto (CA)

(72) Inventors: Ray Arbesman, Toronto (CA); Winston Mackelvie, Knowlton (CA)

(73) Assignee: Nucap Industries Inc., Ontario (CA)

( * ) Notice: Subject to any disclaimer, the term of this patent is extended or adjusted under 35 U.S.C. 154(b) by 0 days.

(21) Appl. No.: 14/669,246

(22) Filed: Mar. 26, 2015

(51) Int. Cl.
| | |
|---|---|
| *F16D 65/00* | (2006.01) |
| *F16D 69/04* | (2006.01) |
| *B32B 3/30* | (2006.01) |
| *B32B 7/12* | (2006.01) |
| *B32B 15/04* | (2006.01) |

(52) U.S. Cl.
CPC . *F16D 69/04* (2013.01); *B32B 3/30* (2013.01); *B32B 7/12* (2013.01); *B32B 15/04* (2013.01); *B32B 2255/06* (2013.01); *B32B 2255/26* (2013.01); *B32B 2475/00* (2013.01); *F16D 2069/0441* (2013.01); *F16D 2069/0466* (2013.01)

(58) Field of Classification Search
CPC .................... F16D 2069/05; F16D 2069/0441; F16D 2069/0466
See application file for complete search history.

(56) References Cited

U.S. PATENT DOCUMENTS

| | | |
|---|---|---|
| 1,897,088 A | 2/1933 | Victor |
| 1,915,221 A | 6/1933 | Fitzgerald |
| 2,171,530 A | 9/1939 | Balfe |
| 2,255,268 A | 9/1941 | Perrine |
| 3,092,532 A | 6/1963 | Swick et al. |
| 3,170,354 A | 2/1965 | Scholl |
| 3,513,950 A * | 5/1970 | Crawford et al. ......... 188/250 G |
| 3,533,891 A | 10/1970 | Puyear |
| 3,551,232 A | 12/1970 | Thompson |
| 3,605,360 A | 9/1971 | Lindal |
| 3,615,994 A | 10/1971 | MacLaine et al. |
| 4,023,613 A | 5/1977 | Uebayasi et al. |
| 4,234,638 A | 11/1980 | Yamazoe et al. |
| 4,552,252 A | 11/1985 | Stahl |
| 4,569,424 A | 2/1986 | Taylor, Jr. |
| 4,640,390 A | 2/1987 | Saumweber et al. |
| 4,705,278 A | 11/1987 | Locacius et al. |

(Continued)

FOREIGN PATENT DOCUMENTS

| | | |
|---|---|---|
| CA | 1330521 C | 10/1988 |
| CA | 1337622 C | 3/1989 |

(Continued)

OTHER PUBLICATIONS

Tanged Metal Reinforced Graphite Gasket datasheet, Ningbo Sunwell Fluid Technologies Co. Ltd. 2010.

(Continued)

*Primary Examiner* — Bradley King
(74) *Attorney, Agent, or Firm* — Kilpatrick Townsend & Stockton LLP (57) ABSTRACT

A laminate comprises a first ductile material textured with barbs and a second friable material. First material is preferably electro-plated steel. Second material may be a brake friction composition. Barbs may be pointed or headed or in combination. Second material may be in the form of castings, sheets or pads. Second material may be impaled by at least some of the barbs. Lamination of first and second materials preferably includes an adhesive therebetween. The adhesive may include uncured rubber to be vulcanized in place.

8 Claims, 5 Drawing Sheets

(56) References Cited

U.S. PATENT DOCUMENTS

| | | | |
|---|---|---|---|
| 4,723,783 A | 2/1988 | Belter et al. | |
| 4,776,602 A | 10/1988 | Gallo | |
| 4,781,389 A | 11/1988 | Beyer et al. | |
| 4,815,172 A | 3/1989 | Ward | |
| 4,911,972 A | 3/1990 | Mercuri | |
| 4,939,818 A | 7/1990 | Hahn | |
| 5,067,210 A | 11/1991 | Keyaki | |
| 5,142,743 A | 9/1992 | Hahn | |
| 5,143,184 A | 9/1992 | Snyder et al. | |
| 5,172,920 A | 12/1992 | Schlenk | |
| 5,362,074 A | 11/1994 | Gallo et al. | |
| 5,376,410 A * | 12/1994 | MacKelvie | 427/290 |
| 5,413,194 A * | 5/1995 | Kulis et al. | 188/251 A |
| 5,469,604 A | 11/1995 | Calmettes et al. | |
| D374,609 S | 10/1996 | Akeno | |
| D376,533 S | 12/1996 | Akeno | |
| 5,611,122 A | 3/1997 | Torigoe et al. | |
| 5,732,800 A * | 3/1998 | Spigener | 188/234 |
| 5,788,247 A | 8/1998 | Tensor | |
| D400,427 S | 11/1998 | Okawa et al. | |
| 5,842,546 A | 12/1998 | Biswas | |
| 6,022,502 A * | 2/2000 | Lockhart et al. | 264/113 |
| D425,405 S | 5/2000 | Naohara et al. | |
| 6,247,704 B1 | 6/2001 | Battistoni | |
| 6,258,457 B1 | 7/2001 | Ottinger et al. | |
| 6,276,045 B1 | 8/2001 | Buchi et al. | |
| 6,279,222 B1 * | 8/2001 | Bunker et al. | 29/527.5 |
| 6,431,331 B1 | 8/2002 | Arbesman | |
| 6,464,047 B1 | 10/2002 | Arbesman | |
| 6,622,346 B2 | 9/2003 | Graham et al. | |
| 6,671,935 B2 | 1/2004 | Filion et al. | |
| 6,843,095 B2 | 1/2005 | Arbesman | |
| 6,860,368 B2 | 3/2005 | Kulis, Jr. et al. | |
| 6,910,255 B2 | 6/2005 | Arbesman | |
| 6,913,673 B2 | 7/2005 | Baggot et al. | |
| 7,048,097 B2 | 5/2006 | Arbesman | |
| 7,222,701 B2 | 5/2007 | Pham | |
| 7,320,386 B2 | 1/2008 | Kulis, Jr. et al. | |
| 7,686,142 B2 * | 3/2010 | Jung | 188/250 B |
| 7,841,052 B2 | 11/2010 | Ducauchuis | |
| 7,989,049 B2 | 8/2011 | Potier | |
| 8,048,507 B2 | 11/2011 | Townsend et al. | |
| 8,088,316 B2 | 1/2012 | Muth et al. | |
| D654,355 S | 2/2012 | Cheng | |
| 8,407,864 B2 | 4/2013 | Mask et al. | |
| 8,683,840 B2 | 4/2014 | Tuma et al. | |
| 8,685,520 B2 | 4/2014 | Meyer et al. | |
| 2002/0170789 A1 | 11/2002 | Poelemans | |
| 2003/0127291 A1 * | 7/2003 | Wood et al. | 188/218 XL |
| 2004/0016608 A1 * | 1/2004 | Gutowski | 188/73.1 |
| 2004/0099493 A1 * | 5/2004 | Himmelsbach et al. | 188/250 B |
| 2004/0140165 A1 | 7/2004 | Pham | |
| 2004/0182672 A1 * | 9/2004 | Hartner et al. | 192/107 M |
| 2005/0170157 A1 | 8/2005 | Armela et al. | |
| 2006/0027427 A1 | 2/2006 | Anda et al. | |
| 2006/0246256 A1 | 11/2006 | Ausen et al. | |
| 2006/0260881 A1 * | 11/2006 | Henley et al. | 188/1.11 W |
| 2008/0003401 A1 | 1/2008 | Barnes et al. | |
| 2009/0223753 A1 | 9/2009 | Kappagantu et al. | |
| 2010/0170758 A1 | 7/2010 | Chen | |
| 2010/0207334 A1 | 8/2010 | Virgin et al. | |
| 2011/0051724 A1 | 3/2011 | Scott et al. | |
| 2011/0079065 A1 | 4/2011 | Cabanski et al. | |
| 2011/0233875 A1 | 9/2011 | Shaver et al. | |
| 2011/0260371 A1 | 10/2011 | Arora et al. | |
| 2012/0003462 A1 | 1/2012 | Wong | |
| 2012/0006959 A1 | 1/2012 | Braun et al. | |
| 2013/0152654 A1 | 6/2013 | Arbesman et al. | |
| 2015/0053517 A1 | 2/2015 | Arbesman et al. | |
| 2015/0086750 A1 | 3/2015 | Arbesman et al. | |
| 2015/0099093 A1 | 4/2015 | Arbesman et al. | |

FOREIGN PATENT DOCUMENTS

| | | |
|---|---|---|
| CA | 2127339 A1 | 7/1994 |
| CA | 2272115 | 11/1999 |
| CA | 2391183 | 12/2003 |
| CA | 2778455 A1 | 11/2013 |
| CA | 145893 ID | 12/2013 |
| CA | 2780397 A1 | 12/2013 |
| CA | 2798303 A1 | 6/2014 |
| CA | 2821897 | 1/2015 |
| CA | 2855378 | 1/2016 |
| DE | 19754740 A1 | 3/1999 |
| DE | 102004048464 A1 | 4/2006 |
| DE | 102006015100 A1 | 10/2007 |
| DE | 102006015145 A1 | 10/2007 |
| DE | 102006015148 A1 | 10/2007 |
| EP | 0859163 A1 | 8/1998 |
| EP | 934820 A2 | 8/1999 |
| GB | 2125126 A | 2/1984 |
| GB | 2507128 A | 4/2014 |
| WO | 2011051724 | 5/2011 |
| WO | 2013/177667 | 12/2013 |
| WO | 2015010183 | 1/2015 |

OTHER PUBLICATIONS

Tanged Graphite datasheet, Alba Gaskets.
Graphite Sheet with Tanged Metal datasheet, Cixi Cazseal Packing & Gasket Co, Ltd.
Supagraf Expanded Graphite Jointings datasheet, James Walker & Co.
SLT-20 Tang Sheet Specifications datasheet, Dynoteq Kft.
Tanged Stainless Steel Reinforced Graphite Sheet datasheet, Gee Graphite.
Specification Sheet: SPG7003, SPG Gaskets Co.
Graphite Sheet Gaskets, Environmental Gasket Company Ltd. 2009.
U.S. Appl. No. 14/532,739, filed Nov. 4, 2014 entitled "Precursor Laminate and Method for Forming a Laminate".
U.S. Appl. No. 14/533,218, filed Nov. 5, 2014 entitled "Wood-Steel Composite Structure".

* cited by examiner

FRICTION FUSION FASTENING SYSTEM

FIELD OF THE INVENTION

Laminates comprising friable material laminated to ductile material such as brake pads and shoes, and lamination methods thereof.

BACKGROUND OF THE INVENTION

Disc brake pads are an example of a laminate where a friable pad of friction material is bonded to a backing plate of ductile steel. The plate lamina backs the friable friction lamina, preventing it from cracking or fracturing. Concrete, cement, gypsum board and the like are examples of friable materials that may likewise be laminated to more ductile materials. In this disclosure, the brake pad will be used as the exemplary laminate.

Brake pads are subject to enormous stress. High shear forces combine with extreme range of temperature, and, severe environmental exposure. Yet they are fundamental to safe vehicle operation.

By way of background, today's brake pads are mould-bonded where a mixture of assorted powdered minerals and resins along with organic and metallic fibres is compressed in a mould onto a bare, steel backing plate. With heat, the resin first melts to wet the plate and permeate the mixture and then cures, resulting in a rock-hard friction pad bonded to the plate's surface with a thin layer of adhesive, which is referred to as the bond line.

Mould-bonding is a slow, inefficient batch process where friction powder is compressed onto bare steel backing plates set in moulds. Batches of filled moulds are then pressure-heated, cooled, and unloaded, and then cleaned for reuse.

During braking, especially with a heavy and/or fast moving vehicle, the hydraulic caliper squeezes the brake disc with the brake pads resulting in frictional drag that generates high temperatures and high shear forces at the bond line.

Over time, moisture reaches the bare steel which begins rusting. The rust, in turn, progressively weakens the bond line which can lead to partial or full delamination, a highly dangerous condition.

An electro-plated or otherwise protectively coated steel backing plate is not suitable for the mould-bonding process because the process requires a clean, bare steel surface.

Friction pads used to be riveted to plated steel. However, the holes led to fracturing-crumbling-spalling of the pad, escalating with wear. If rivet heads wore off, the unsecured friction made for dangerous conditions. As a result rivets have largely been replaced by the above described mould-bonded brake pad and its aforementioned rust problem.

SUMMARY OF THE INVENTION

The present invention provides a laminate including a base lamina of ductile material, a second lamina of friable material and adhesive located between the base lamina and the second lamina. The inner surface of the base lamina has multiple barbs raised from the surface, each barb having a shank and a distal end. The distal end is the end of the barb furthest apart from the inner surface of the base lamina from which the barb was raised. The adhesive surrounds the shanks of the barbs and bonds the inner surface of the base lamina and the inner surface of the second lamina together. The distal ends of some, but not all, of the barbs are embedded in the second lamina, so that they extend through the inner surface of the second lamina with a portion of each embedded barb being surrounded by the friable material. In addition to the embedded barbs, there are also multiple shorter barbs that are about the same height as each other. The height of the shorter barbs is less that the heights of the embedded barbs so that the shorter barbs do not pierce the inner surface of the second lamina. The distal ends of the shorter barbs define a plane proximate to and parallel to the inner surface of the second lamina.

The distal ends of the shorter barbs may contact the inner surface of the second lamina. The shorter barbs may flattened so that the distal end of each shorter barb is flat and the flat distal end overhangs the shank of the barb.

The base lamina is preferably made of steel that has been coated or electroplated after the barbs were raised so that the base lamina and the barbs are corrosion resistant. The laminate may be a brake backing plate, and the friable material may be friction material so that the laminate is a brake pad.

The adhesive may be a phenolic resin adhesive.

Each barb may be gouged out of the surface by a cutting blade to form a pointed nail-like structure. Alternatively, each barb may be a tang formed by stabbing a triangular tipped chisel into the inner surface of the base lamina at a near-vertical angle.

The invention also provides other embodiments of laminates, each such laminate including a base lamina of ductile material, a second lamina of friable material and a bonding layer that bonds the inner surface of the base lamina to the inner surface of the second lamina. The inner surface of the base lamina has multiple barbs raised from the surface, each barb having a shank and a distal end. The distal end is the end of the barb furthest apart from the inner surface of the base lamina from which the barb was raised, the spacing being referred to as the height of the barb. Each barb has approximately the same height so that the distal ends of the barbs define a plane proximate to and parallel to the inner surface of the second lamina. The distal ends of substantially all the barbs are flat so that the distal end of each barb overhangs the shank of the barb. The bonding layer surrounds the barbs. The barbs do not contact or pierce the inner surface of the second lamina.

The bonding layer may be formed from an adhesive, such as a phenolic resin adhesive. Alternatively, the bonding layer may be formed from vulcanized rubber together with an adhesive. In such embodiments, the adhesive is first applied to the inner surface of the second lamina. The laminate is then formed by placing a raw, compounded, or uncured (i.e. unvulcanized) rubber sheet containing a curative between and adjacent to the adhesive on the inner surface of the second lamina and the inner surface of the base lamina to form an assembly. The assembly is then compressed and heated so that the rubber flows around the barbs and under the flat distal ends of the barbs and vulcanizes. The base lamina is preferably made of steel that has been coated or electroplated after the barbs were raised so that the base lamina and the barbs are corrosion resistant. The base lamina may be a brake backing plate, and the friable material may be friction material so that the laminate is a brake pad. In that case, the backing plate may have one or more integral moulding holes through it, so that, prior to heating and pressing the laminae together, material comprising unvulcanized rubber may be placed in the holes. In that case, the rubber placed in the holes is also vulcanized by the heat and pressure. Each barb may be gouged out of the inner surface of the base lamina by a cutting blade to form a pointed nail-like structure. Alternatively, each barb may be a tang formed by stabbing a triangular tipped chisel into the inner surface of the base lamina at a near-vertical angle.

The invention also provides a laminate including a base lamina of ductile material, a second lamina of friable material and a third lamina positioned between the base lamina and the second lamina. The inner surface of the base lamina has multiple barbs raised from the surface. Each barb has a shank and a distal end. The distal ends of substantially all the barbs are flat so that the distal end of each barb overhangs the shank of the barb. The third lamina is a sheet of ductile material having multiple barbs raised from both its upper and lower surfaces. The distal end of each barb is flat so that the distal end of each barb overhangs the shank of the barb. In forming the laminate, one surface of the third lamina is first coated with adhesive. Then, uncured friable material is moulded over the coated surface of the third lamina and allowed to flow beneath the flat distal ends of the barbs raised from the surface. Then, the friable material is cured so that it forms the second lamina. The other surface of the third lamina and the inner surface of the base lamina are bonded together by adhesive. The barbs on the base lamina and the barbs raised from the other surface of the third lamina commingle in the adhesive. The base lamina is preferably made of steel that is coated or electroplated after the barbs were raised so that the base lamina and the barbs are corrosion resistant.

The invention further provides a method of making a laminate from a base lamina of ductile material and a second lamina of friable material. The inner surface of the base lamina has a plurality of barbs raised from it, each barb having a shank and a distal end. Each barb has substantially the same height. The distal ends of substantially all the barbs are flat so that the distal end of each barb overhangs the shank of the barb. The base lamina is placed on a surface and travel stop blocks are also placed on the surface so that the travel stop blocks extend above the flat heads of the barbs by a predetermined gap size. Adhesive is applied either to the inner surface of the second lamina or to the flat heads of the barbs, or to both. Then, the second lamina is placed above the heads of the barbs and is pressed down onto the first lamina using a pressure plate until the pressure plate is stopped by the travel stop blocks so some of the adhesive is below the flat heads of the barbs. In this way, a layer of adhesive having a thickness equal to the gap size is formed between the flat heads of the barbs and the inner surface of the second lamina. The base lamina is preferably made of steel that has been coated or electroplated after the barbs were raised so that the base lamina and the barbs are corrosion resistant. The base lamina may be a brake backing plate, and the friable material may be friction material so that the laminate is a brake pad.

This method may further include a step of producing the base lamina starting with a lamina of ductile material whose inner surface has multiple barbs raised from it. The lamina is placed on a surface and each of a second set of travel stop blocks is also placed on the surface so that the tops of the travel stop blocks are closer to the surface than the distal ends of substantially all of the barbs. Then, a pressure plate is pressed down on the barbs so that the pressure plate flattens the distal ends of the barbs and comes to rest on the tops of the travel stop blocks, thereby forming the base lamina.

DETAILED DESCRIPTION

The instant invention offers a number of different embodiments to overcome the limitations of the prior art, which can be conveniently separated into two families of embodiments. In one family, the ductile lamina has an array of raised piercing elements (hereinafter referred to as barbs) each barb comprising root, shaft and tip portions. With sufficient force, the pointed tips can pierce or pulverize a path into a friable lamina. This creates a unique mechanical joint that effectively pins the two laminae together. When combined with bonding from the adhesive, a joint with exceptional shear strength is created.

In another family of embodiments the barbs are headed, that is, by pressing with a flat plate, the pointed tips and upper part of the barb shaft are flattened down, forming heads that overhang the shafts. The array of headed barbs serve four purposes: (1) to limit the vertical travel of the friable lamina being pressed down; (2) as a bed parallel to the plate for the friable lamina; (3) as an array of contacts for the adhesive to bond to; (4) to provide entrapment for the hardened adhesive that has flowed beneath. The result, again, is a mechanically and adhesively bonded joint with exceptional shear strength.

As used herein, "barb" means any type of nail-like or pin-like structure, or hooked structure, raised from the surface of a material by carving, gouging, planing or scraping its surface, such as is described in Canadian patent numbers 1,330,521, 1,337,622, and 2,127,339 and in Canadian patent application number 2,778,455, all of which are hereby incorporated in their entirety herein by reference, or means a tang formed by stabbing a triangular tipped chisel into the surface of the material at a near-vertical angle. The use of such textured materials to form laminates is described in Canadian patent application numbers 2,778,455, 2,821,897 and 2,855,378, and U.S. patent application Ser. Nos. 14/532,739 and 14/533,218, all of which are hereby incorporated in their entirety herein by reference.

In making the instant laminate, using the brake pad as the example, the two principal laminae are a pad of friable friction and a corrosion resistant steel plate.

The friction material is shaped as needed for the particular braking system design, and the cured material has parallel faces. The face for bonding to the plate is preferably abraded or otherwise prepared to receive the adhesive.

The steel plate is stamped to shape and textured with barbs on one face. It is then coated or electro-plated or otherwise treated to protect it from corrosion such as rust.

An adhesive system is chosen based on the laminate's performance requirements. For brake pads, a phenolic resin adhesive is generally used for its high temperature strength. Adhesives can be applied to one or both laminae. An uncured rubber sheet with a curative may also be used as an adhesive. Placed between the friction and plate, the clamped assembly is heated to vulcanize the rubber in place. Such a rubber adhesive system may be used in combination with other adhesives.

In a first embodiment, the barbed backing plate has fewer tall barbs distributed amongst many short barbs. The two laminae are pressed together such that the long pointed barbs pierce into the surface, the friable material lamina coming to rest on the shorter barbs about and under which the adhesive flows and hardens.

In a second embodiment, all of the barbs are initially tall and pointed. Then, a pressure plate with spaced holes presses down onto the array of barbs, heading most of them. Stop blocks for the pressure plate ensure the array of heads are all of the same height thereby creating a plane of heads parallel to the plate. Those barbs that enter the plate's holes are unaffected and so remain tall and pointed. As before the two laminae are pressed together with an adhesive between them such that the long barbs pierce at least some distance into the friction material as it comes to rest on the headed barbs about which the adhesive flows and hardens.

In a third embodiment, all the barbs on the plate are small, short and pointed such that they all pierce, but only to a small diameter and depth that precludes fracturing. Adhesive again fills the gaps and interstices.

In a fourth embodiment a three-layer laminate has a separate interlayer sheet of textured and plated steel with headed barbs on both faces, and is over moulded with friction material that flows beneath the barb heads locking the two laminae together. Adhesive in the friction material compliments the resulting mechanical bond. This laminate with adhesive added is then pressed onto a third lamina, an electro-plated steel plate whose barbs have also been headed such that the heads of the sheet and plate commingle. As well, all heads are embedded in adhesive, resulting in a high shear strength joint on plated steel.

In a fifth embodiment all the barbs are headed using a pressure plate with stop blocks that limit the travel of the plate. The heads are thus made uniform in height and parallel to the plate. Adhesive is applied to the friction material lamina (and/or to the barb heads), and when pressed onto the heads using a pressure plate, the adhesive flows beneath, hardens and locks the two laminae together. The pressure plate for the friction material lamina is again limited in travel by a second set of stop blocks designed to ensure that a small gap remains between the heads and the surface of the friction material. That gap is of course filled with the adhesive. In this way some resilience is created in the bond line which serves to absorb vibrations, a source of annoyance to drivers.

In this way an isolating, unbroken, elastomeric lamina is formed between the friction material lamina and the barbs. Such a layer has desirable vibration absorption properties.

In a sixth embodiment, raw, compounded, or uncured rubber sheet is placed between the friction material on which adhesive has been applied, and the headed barbs prepared as described in the fifth embodiment. With heat and pressure the raw rubber flows and/or is squeezed about the heads where it vulcanizes to its hard and tough form. The plate by which the pressure is applied is, as before, also limited in travel by stop blacks such that a small gap exists between the heads and the friction surface that fills with rubber.

A seventh embodiment is as the sixth but with additional rubber elements added to the holes that are common in brake backing plates (known as integral moulding holes or IM holes in the trade). The additional uncured rubber, for example, in the form of cylinders or spheres, is dropped into the IM holes prior to assembly. The friction pad with the uncured rubber sheet adhesively fixed or bonded thereto is stop-pressed into place. On heating, the uncured rubber melds and vulcanizes to the surfaces it has contacted and enveloped, including the barb heads, the IM holes and interstices throughout the joint.

In an eighth embodiment the texturing process produces tangs. Tangs are pointed, triangular mounds of metal created by rapidly stabbing a triangular tipped chisel into a plate's surface at a near-vertical angle to create a plurality of depressions or cavities. Rather than horizontally ploughing a barb from a groove, the tang comprises material that has been plastically displaced from the cavity. As before, a perforated plate can be used to press the majority of the tang points to create hook-shaped heads while leaving others pointed for piercing. Adhesive is added before pressing it onto the friable lamina.

The brake pad made in the manner described above overcomes the aforementioned weaknesses of both the fracturing of the rivet and rusting of the mould-bonding methods, and can be manufactured in an efficient, continuous assembly process.

In all embodiments it is preferable that the plate is textured before being plated (e.g., electro-plated with zinc) or otherwise coated (e.g., e-coated, passivated, chromated).

Stated otherwise, the plate along with the barbs and their grooves, and/or the tangs and their depressions, are all plated to protect from rust and other forms of bond-weakening corrosion. Texturing after plating would expose bare steel to corrosion.

Although directed at brake pad manufacture, such coating/plating of textured metal may be appropriate for bonding other materials such as cementaceous materials where environmental exposure may lead to bond failure.

In all embodiments an adhesive appropriate to the end use of the laminate is chosen, including, but not limited to, thermosets, thermoplastics, phenolics, uncured (raw) rubber, and coated papers, textiles, fabrics, foils and films and prepregs thereof.

Figure 1:
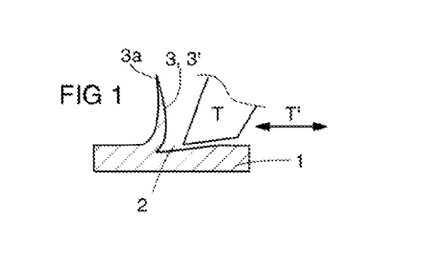
FIG. 1 shows a cross-section of a plate where a cutting tooth has traversed the surface to plough a groove and thereby raise a pointed barb.

FIG. 1 depicts the method of texturing a surface where blades with tooth tips T horizontally traverse T' the surface of a plate 1 ploughing short, shallow grooves 2 and raising unsevered chips of metal 3, 3' (the barbs) at the end of each groove 2. Numerous such teeth T are carried on blades arranged side by side, typically with their teeth pointing in opposite directions.

Figure 1A:
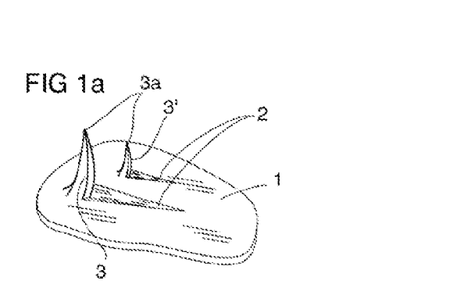
FIG. 1a shows a perspective view of a portion of a sheet or plate of ductile material with two pointed barbs of different heights raised from grooves that have been ploughed to different lengths and/or depths. The tip and shaft portions are depicted rising up from the root portion in the plate.
Figure 1B:
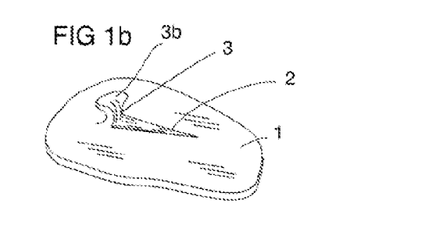
FIG. 1b shows how barbs (one barb shown) can be headed by a pressure plate (not shown) that crushes the tip and part of the shaft into a somewhat flattened head that overhangs the now shorter shaft.

In FIGS. 1, 1a, pointed barbs 3, 3' can be seen to have a piercing quality. However, using a pressure plate B (FIG. 5) the barb shafts 3 are made shorter as the tips 3a are flattened to a head 3b (FIG. 1b). Because the heads overhang the shank 3, hardened adhesive 30' (FIG. 11) under the head 3b will be trapped or locked to the barb shank 3 and hence to the plate 1.

Thus when adhesively bonding two surfaces together, at least one being textured with headed barbs 3b, the two surfaces become physically/mechanically locked together in a way that reinforces the chemical/molecular adhesive bond.

Figure 2:
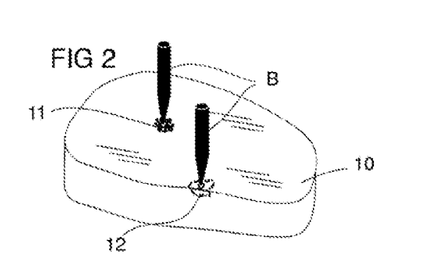
FIG. 2 depicts what happens when a point is forced into a friable material. The small, shallow hole results in pulverized material ejected from the hole. Too large a point, too deep a hole, or too near an edge or other feature, and the material is very likely to fracture or crumble.

FIG. 2 shows what happens when a pointed tool B that has too large a tip diameter and/or is forced too deeply into the surface of a friable material 10. The tool pulverizes its way into the friable material 10, ejecting a mound of powder 11. Similar piercing done near an edge, hole or other feature (unsafe areas), leads to extensive fracturing-crumbling-spalling 12 of the friable material 10.

In the instant invention the barb piercings are shallow, and/or small diameter and/or are positioned in "safe" areas, for example spaced apart from edges or holes.

Figure 3:
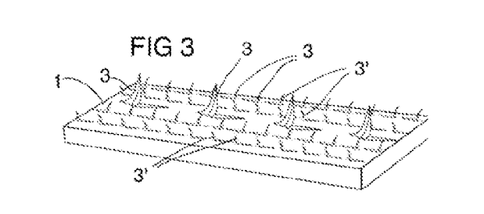
FIG. 3 is a perspective view of a plate that has had its surface textured according to FIG. 1 but with cutting teeth of different sizes such that most barbs are short with some taller barbs interspersed therewith.

FIG. 3 shows the first embodiment of a textured steel plate having barbs 3, 3' of different heights. Importantly, fewer taller barbs 3 with pointed tips 3a are dispersed amongst more numerous shorter barbs 3'. In this way when a friable material such as a brake friction material puck is forced onto the plate, the resulting piercings are spaced apart to prevent fracturing therebetween. Preferably, sufficient adhesive is applied to the friction material puck to engulf the shorter barbs 3' to provide entrapment-anchoring.

Figure 5:
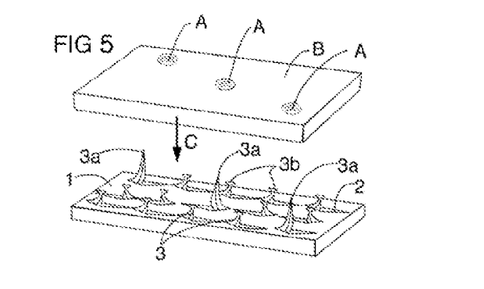
FIG. 5 is another embodiment where all the barbs start out long (tall) and pointed but, using a pressure plate with spaced holes, most of the barbs are headed so that adhesive will be trapped or captured beneath. Those long barbs which enter the plate's holes are unaffected.
Figure 6:
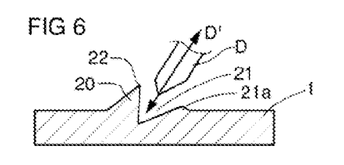
FIG. 6 show a near-vertical chisel can be used to rapidly stab into a surface so as to raise up tangs or pointed elements by plastic-deformation.
Figure 7:
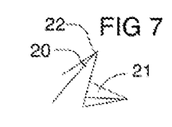
FIG. 7 is a perspective view of a tang.
Figure 8:
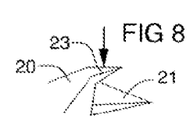
FIG. 8 shows the tang of FIG. 7 where the tip has been pressed down to create a hook-like tip under which adhesive can be trapped.
Figure 9:
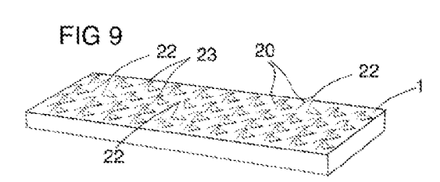
FIG. 9 depicts a plate textured with tangs, most of which have been headed down, leaving a few taller and pointed tangs dispersed throughout the shortened ones.
Figure 10:
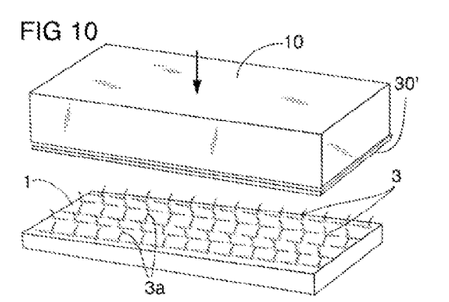
FIG. 10 shows the assembly of friction material, adhesive, and the barbed plate of FIG. 4 where the two laminae have been mechanically-adhesively joined.
Figure 17:
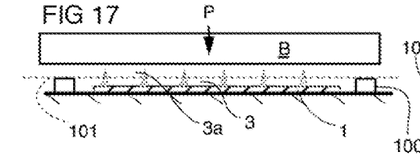
FIG. 17 shows a plateauing process where a backing plate with pointed barbs is positioned under a pressure plate. Stop blocks (two shown) of the required height are placed to limit the travel of the pressure plate and ensure that it stops parallel to the backing plate surface.
Figure 18:
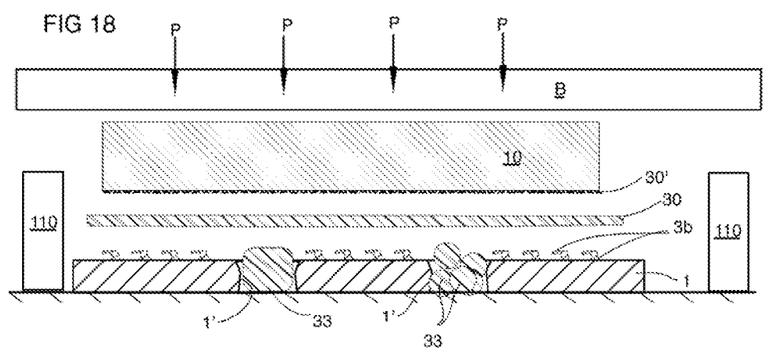
FIG. 18 shows a textured backing plate with plateaued barbs and a friction plate with adhesive thereon. A layer of uncured rubber lies between. Additional uncured rubber at least partially fills the any holes or recesses in the backing plate.

In FIG. 5 the second embodiment is shown where the protected plate component 1 is first textured with equal height barbs 3 after which a plate B having holes A is pressed down to head the barbs trapped beneath. Stop blocks 100 as shown in FIGS. 17 and 18 can be used to plateau the heads. Barbs that enter holes A in the plate B remain full height and pointed 3a. This method advantageously creates a mixture of piercing and headed barbs that enter the friction material and lock to the adhesive, respectively.

Figure 4:
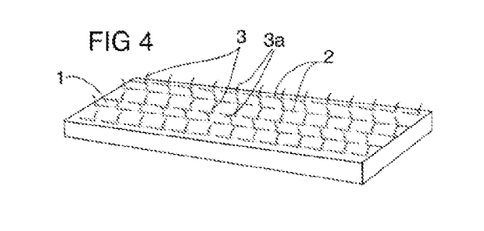
FIG. 4 is a perspective of another embodiment where the textured surface has only short, pointed barbs.

In FIG. 4, the third embodiment, plate 1, is textured only with small, short barbs 3 with pointed tips 3a. As with the previous embodiment, the friction material puck has adhesive applied thereto. The two laminae are forced together causing the barbs 3 to at least partially enter the friction material puck and the adhesive to permeate therebetween.

Figure 15:
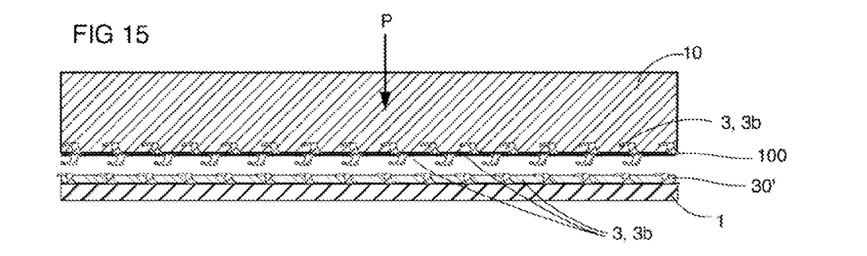
FIG. 15 shows a friction pad with an interlayer barbed sheet with barbs on both surfaces. The upper barbs are shown pre-imbedded in the cured friction material. The lower barbs have been plateaued to be even in height and parallel to the friction. On assembly with the plate, whose barbs have also been plateaued level, the barbs commingle through the adhesive.
Figure 15A:
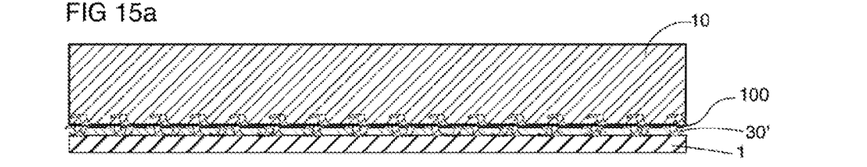
FIG. 15a shows the embodiment of FIG. 15 after assembly.

FIGS. 15 and 15a show a forth embodiment where an interlayer 100 has headed barbs 3, 3b on both faces. One face has friction material moulded or otherwise embedded. The plate 1 also has headed barbs 3, 3b. Adhesive 30' is shown on the plate. On assembly as shown in FIG. 15a the heads 3b from both the plate 1 and the interlayer 100 commingle and embed in the adhesive, which hardens to lock everything together.

Figure 16:
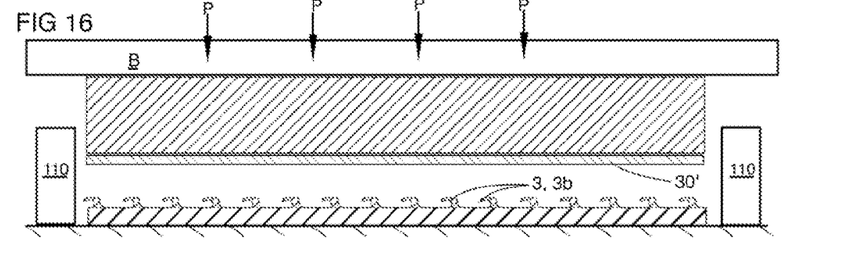
FIG. 16 shows another embodiment where the friction material with an adhesive layer is to be pressed onto the headed barb backing plate.
Figure 16A:
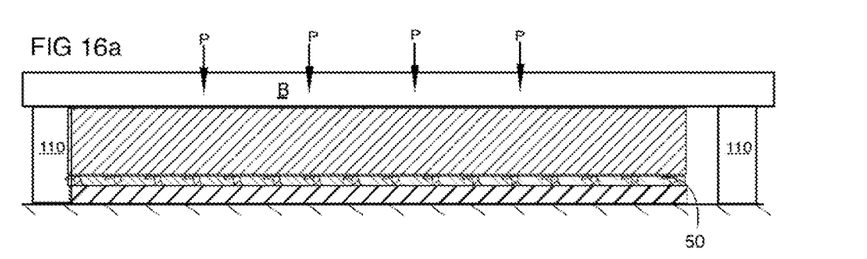
FIG. 16a shows the embodiment of FIG. 16 after assembly showing how the barb heads embed and are trapped in the adhesive.

FIGS. 16 and 16a (before and after assembly respectively) show the fifth embodiment where headed and plateaued barbs 3b on plate 1 become embedded in the adhesive 30' as shown in FIG. 16a. Also shown are stop blocks 110 for pressure plate B. Stop blocks 110 are dimensioned so as to leave a small gap 50 between the barb heads 3b and the friction material 10. This arrangement can provide extra resiliency and isolation of the steel from the friction material to absorb vibration generated at the friction-rotor interface, reducing transmission through to the steel plate, and from there to the driver's ears by way of the caliper, hub, suspension and vehicle chassis.

Figure 19:
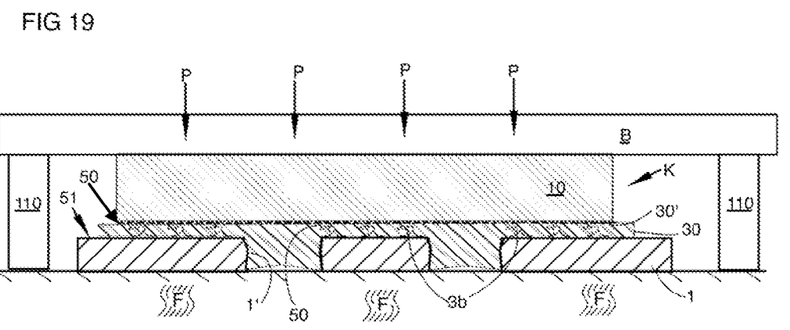
FIG. 19 shows the embodiment of FIG. 18 assembled, held under pressure and heated, showing how the raw rubber vulcanizes to itself, and to all surfaces it contacts yielding a single element filling the holes, embedding the barbs, filling all interstices, and preferably extruding somewhat beyond the pad's perimeter.
Figure 20:
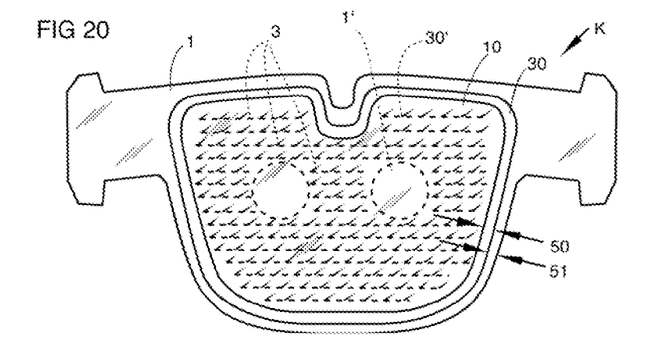
FIG. 20 shows a top view of the embodiment of FIG. 19 in the form of a typical disc brake pad where the barbs and the integral moulding holes beneath the surface are shown in dotted outlines, and showing perimeter extrusion of the vulcanized rubber.

FIGS. 18-20 show the sixth embodiment where the adhesive system includes a layer of raw or uncured rubber sheet 30 and filler pieces 33 of same. Regular adhesive 30' (e.g., phenolic resin) adheres the rubber 30 to the friction 10. Plate 1 has integral moulding holes 1'. Rubber filler pieces 33 for these holes may be of any suitable shape such as spheres or cylinders, as shown in FIG. 18. FIG. 19 shows the brake pad K assembled with appropriate heat F on plate 1 and pressure P on pressure plate B, both of which are held constant for the required time such that the rubber sheet 30 and filler pieces 33 meld into a single rubber continuum vulcanized to all surfaces including the filled holes 1', embedded barb heads 3b, and all interstices. A vulcanized rim 50 that serves as a perimeter seal is extruded. As with the fifth embodiment, FIGS. 18 and 19 show travel stops 110 for pressure plate B that ensure a small gap 50 remains between the friction material 10 and the planar array of barb heads 3b. The gap 50 is filled with vulcanized rubber for added strength and noise abatement.

FIG. 20 shows a top view of a finished disc brake pad K made in accordance with the sixth embodiment. The headed barbs 3b and the integral moulded holes 1' are of course beneath the top friction material layer 10 and are therefore identified by dotted lead lines. A perimeter seal 50 is shown to be within a marginal area 51 of the plate 1.

Figure 17A:
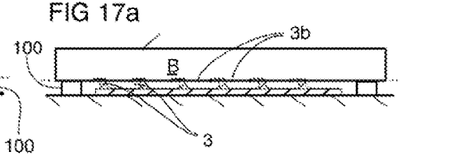
FIG. 17a shows the result of pressing the pressure plate of FIG. 17 down: the barb's tips and upper shafts are flattened into heads made even and parallel to the backing plate by the stop blocks.

As is applicable to multiple embodiments, FIGS. 17 and 17a shows how headed barbs can be plateaued to be even in height and therefore in a plane parallel to the sheet or plate from which they are raised. This is important in brake pad manufacture where the outer friction material surface (wearing surface) must be parallel to the rear of the backing plate to ensure efficient braking and even wear. In FIG. 17, plate 1 has barbs 3 with pointed tips 3a. Four or more travel stops 100, placed as appropriate have a common height 101 to be contacted by pressure plate B. In this way barb tips 3a are reformed into headed barbs 3b and made planar and parallel to plate 1 (or interlayer sheet 100), as shown in FIG. 17a.

FIGS. 6-9 show the eighth embodiment. Triangular tangs 20 with pointed tips 22 are raised from the plate 1. These are the result of impacting the plate 1 with a triangular tipped chisel D at a near vertical angle D' to the plate 1 to produce a cavity 21. Tangs 20 can also pierce friable materials, however their cross sectional area increases expansive effects which in some friable materials may lead to fracturing. Tangs 20 can be pressed to have hooked tips 23 (FIG. 8) to trap adhesive beneath including using a pressure plate B with holes A as in FIG. 5.

Figure 11:
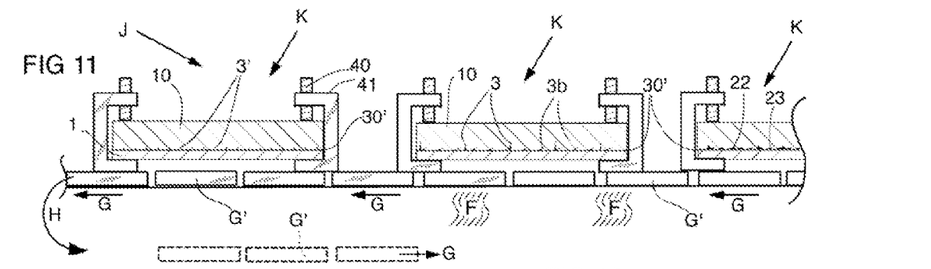
FIG. 11 depicts schematically how a continuous manufacturing process can operate with a moving steel belt carrying assembled and clamped brake pads through an oven to cure the adhesive.

FIG. 11 depicts a production line conveyor J where brake pads K have previously been assembled as described in any of the embodiments above. They are clamped by clamps 40, 41 and carried on links G' on belt G through heat source F (e.g., an oven), whereafter they are removed and the conveyor belt loops back H. The three brake pads K shown in FIG. 11 are in cross-section to show the various barbs and tangs on plate component 1 and how they fit with friction pad component 10. The centre brake pad K represents the second embodiment where spaced piercing barbs 3 enter the friction pad 10 and headed barbs 3b are the bed. The right side brake pad K is shown using the tangs of the eighth embodiment. The left brake pad K in FIG. 11 shows the third embodiment where an array of short pointed barbs have pierced their way into the friction material.

Figure 12:
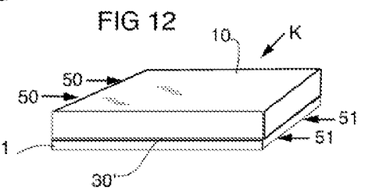
FIG. 12 shows how shear forces develop between the layers of a thick laminate.

FIG. 12 depicts the typical shear forces 50, 51 on a brake pad K. On one side of the bond line 30 the friction surface force 50 is some distance above the plate 10 (on the other side of the bond line) that is held by the caliper (not shown) where that shear force is resisted 51.

Figure 13:
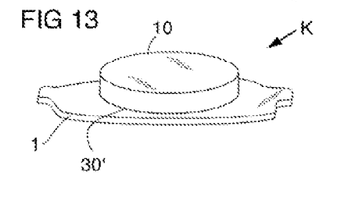
FIG. 13 shows a disc brake pad comprising a backing plate mechanically and adhesively bonded to a pre-formed friction material puck.

FIG. 13 is a perspective view of a disc brake pad K made according to the instant invention with plate 1 and friable friction material puck 10 joined at bond line 30'.

Figure 14:
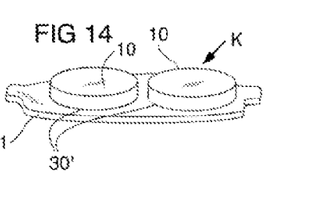
FIG. 14 also depicts a disc brake pad but with two spaced friction material pucks to provide better air cooling, depicting how a standard puck shape of friction material can be used in multiple brake pad designs.

FIG. 14 depicts a brake pad K having two separate and spaced friction material pucks 10. Here the plate 1 may be advantageously textured only in those areas covered by the pads 10. With friction material pucks in a small range of diameters, most brake plate designs can be covered. This arrangement brings the advantages of air cooling for safer, more fade-resistant, and slower wearing brakes.

Figure 21:
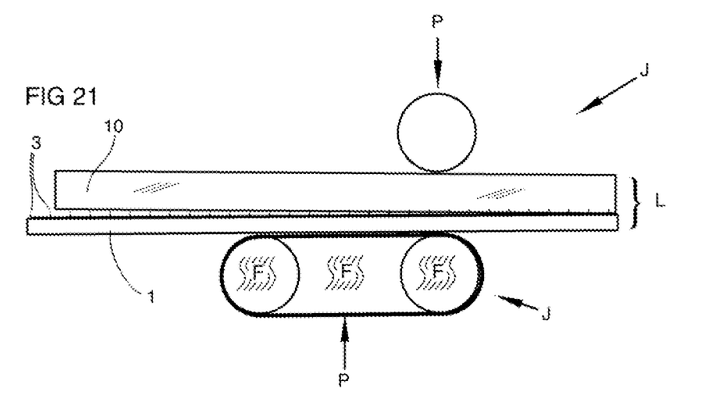
FIG. 21 shows a side view schematic of how sheet friction material and textured steel plates can be roll-laminated to produce a length of laminate. This can be a continuous process whereby a roll of textured ductile steel has hard friction plates laid end-to-end thereon before entering the pressure plate conveyor.

FIG. 21 depicts schematically a roll laminating machine for pressure joining a length of friction material 10 to a length of barbed steel plate 1 to produce a laminate L. Heated belt press J forces the barbs into the friction either by sheer pressure P and/or by the use of heat F which will allow the barbs 3 to soften a piercing path into the friction material's surface. The friction material may be fully cured which would require high pressure P or it may be "green" or partially cured whereby its impalement onto the barbs would require less pressure.

Figure 22:
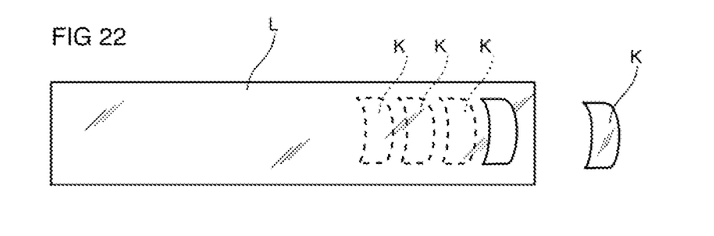
FIG. 22 shows how the resultant laminate can be stamped, punched, sheared, laser cut, water jetted or otherwise separated into finished disc brake pads.

FIG. 22 shows the resultant laminate sheet L of the above described lamination of FIG. 21 and how it can be cut into separate disc brake pads K by known methods of punching or cutting. The dotted outlines with dotted leads to the letter K depict the pending cutout locations of brake pads K which are finished and ready for use.

In summary, the above embodiments of the instant invention describe how a unique fastener-adhesive bond between a plated steel brake plate component 1 and a brake friction pad component 10 is made by having barbs 3 pierce into the hard pad and barbs 3' embed in the adhesive, both adding shear strength. The result is safer brakes and, in turn, safer vehicular travel.

In addition, because the two laminae 1, 10 can be premade, the prior art complex mould-bonding process can be replaced by an efficient continuous manufacturing process.

It should be understood that the above-described embodiments of the present invention, particularly, any "preferred" embodiments, are only examples of implementations, merely set forth for a clear understanding of the principles of the invention. Many variations and modifications may be made to the above-described embodiment(s) of the invention as will be evident to those skilled in the art. That is, persons skilled in the art will appreciate and understand that such modifications and variations are, or will be, possible to utilize and carry out the teachings of the invention described herein.

Where, in this document, a list of one or more items is prefaced by the expression "such as" or "including", is followed by the abbreviation "etc.", or is prefaced or followed by the expression "for example", or "e.g.", this is done to expressly convey and emphasize that the list is not exhaustive, irrespective of the length of the list. The absence of such an expression, or another similar expression, is in no way intended to imply that a list is exhaustive. Unless otherwise expressly stated or clearly implied, such lists shall be read to include all comparable or equivalent variations of the listed item(s), and alternatives to the item(s), in the list that a skilled person would understand would be suitable for the purpose that the one or more items are listed.

The words "comprises" and "comprising", when used in this specification and the claims, are to used to specify the presence of stated features, elements, integers, steps or components, and do not preclude, nor imply the necessity for, the presence or addition of one or more other features, elements, integers, steps, components or groups thereof.

The scope of the claims that follow is not limited by the embodiments set forth in the description. The claims should be given the broadest purposive construction consistent with the description and figures as a whole.

The invention claimed is:

1. A laminate comprising:
   (a) a base lamina of ductile material having outer and inner surfaces, the inner surface having a plurality of barbs raised therefrom, each barb having a shank and a distal end, the distal end being spaced apart from the inner surface of the base lamina;
   (b) a second lamina of friable material having outer and inner surfaces; and (c) adhesive located between the base lamina and the second lamina, the adhesive surrounding the shanks of the barbs, wherein the inner surface of the base lamina and the inner surface of the second lamina are bonded together by the adhesive, and wherein the distal ends of at least some of the barbs are embedded in the second lamina, extending through the inner surface of the second lamina, so that a portion of each embedded barb is surrounded by the friable material, and wherein a plurality of the barbs are shorter barbs having substantially the same height as each other, the height of the shorter barbs being less that the heights of the embedded barbs, wherein the distal ends of the shorter barbs define a plane proximate to and parallel to the inner surface of the second lamina, and wherein the shorter barbs do not pierce the inner surface of the second lamina.

2. The laminate of claim 1, wherein the distal ends of the shorter barbs contact, without piercing, the inner surface of the second lamina.

3. The laminate of claim 1, wherein the shorter barbs are flattened so that the distal end of each shorter barb is flat and the flat distal end overhangs the shank of the barb.

4. The laminate of claim 1, wherein the base lamina is made of steel and has been coated or electroplated after the barbs were raised so that the base lamina and the barbs are corrosion resistant.

5. The laminate of claim 4, wherein the base lamina is a brake backing plate, and the friable material is friction material so that the laminate is a brake pad.

6. The laminate of claim 1, wherein the adhesive is a phenolic resin adhesive.

7. The laminate of claim 1, wherein each barb is gouged out of the surface by a cutting blade to form a pointed structure.

8. The laminate of claim 1, wherein each barb is a tang formed by stabbing a triangular tipped chisel into the inner surface of the base lamina at a near-vertical angle.

\* \* \* \* \*